(12) United States Patent
Yang

(10) Patent No.: US 10,728,208 B2
(45) Date of Patent: Jul. 28, 2020

(54) METHOD FOR IDENTIFYING IP CAMERA AND ENHANCING TRANSMISSION QUALITY BY PACKET TRANSMISSION BASED ON ONVIF SPECIFICATIONS

(71) Applicant: D-Link Corporation, Taipei (TW)

(72) Inventor: Chih-Hung Yang, Taipei (TW)

(73) Assignee: D-Link Corporation, Taipei (TW)

( * ) Notice: Subject to any disclaimer, the term of this patent is extended or adjusted under 35 U.S.C. 154(b) by 281 days.

(21) Appl. No.: 15/815,806

(22) Filed: Nov. 17, 2017

(65) Prior Publication Data
US 2018/0375821 A1  Dec. 27, 2018

(30) Foreign Application Priority Data
Jun. 21, 2017  (TW) .............................. 106120737 A

(51) Int. Cl.
| | |
|---|---|
| *H04L 29/12* | (2006.01) |
| *H04L 12/741* | (2013.01) |
| *H04W 8/00* | (2009.01) |
| *H04N 7/18* | (2006.01) |
| *H04W 88/16* | (2009.01) |
| *H04W 4/70* | (2018.01) |
| *H04W 76/10* | (2018.01) |

(52) U.S. Cl.
CPC .......... *H04L 61/2007* (2013.01); *H04L 45/74* (2013.01); *H04N 7/181* (2013.01); *H04W 8/005* (2013.01); *H04W 4/70* (2018.02); *H04W 76/10* (2018.02); *H04W 88/16* (2013.01)

(58) Field of Classification Search
CPC ..... H04L 61/2007; H04L 45/74; H04N 7/181; H04W 8/005; H04W 4/70; H04W 76/10; H04W 88/16
USPC .......................................................... 709/231
See application file for complete search history.

(56) References Cited

U.S. PATENT DOCUMENTS

| | | | |
|---|---|---|---|
| 2007/0174521 A1* | 7/2007 | Aritomi ................... | H04L 67/16 710/62 |
| 2012/0127318 A1* | 5/2012 | Song ....................... | H04N 7/181 348/159 |
| 2012/0155481 A1* | 6/2012 | Lin ....................... | H04L 12/4641 370/401 |
| 2012/0307071 A1* | 12/2012 | Nishida ................... | H04N 7/188 348/159 |

(Continued)

*Primary Examiner* — Nicholas R Taylor
*Assistant Examiner* — Chong G Kim
(74) *Attorney, Agent, or Firm* — CIPO IP Group

(57) ABSTRACT

A method for identifying an IP camera and enhancing transmission quality by packet transmission based on the ONVIF specifications is applied to a gateway device configured for data transmission to and from at least one IP camera and a network video recorder according to the ONVIF specifications. The gateway device sends a Probe packet to the IP camera after receiving therefrom a Hello packet, analyzes a ProbeMatch packet from the IP camera to identify the IP camera, relays a Resolve packet from the network video recorder to the IP camera in order to receive audiovisual data from the IP camera, and adds an exclusive group code (e.g., VLAN ID) and the highest transmission speed classification (e.g., Quality of Service) to the received audiovisual data to distinguish the audiovisual data from other network packets and give higher priority of transmission to the audiovisual data.

8 Claims, 2 Drawing Sheets

(56) References Cited

U.S. PATENT DOCUMENTS

| | | | |
|---|---|---|---|
| 2013/0155231 A1* | 6/2013 | Ohayon | H04L 67/12 348/143 |
| 2014/0143396 A1* | 5/2014 | Tsai | H04L 65/4069 709/223 |
| 2015/0055832 A1* | 2/2015 | Ptitsyn | G06F 16/783 382/107 |
| 2015/0081721 A1* | 3/2015 | Ptitsyn | H04N 21/2187 707/748 |
| 2016/0065900 A1* | 3/2016 | Liu | G06F 16/786 348/155 |
| 2017/0090810 A1* | 3/2017 | Iwasaki | H04N 5/23206 |
| 2019/0058676 A1* | 2/2019 | Campana | H04L 45/125 |
| 2019/0124156 A1* | 4/2019 | Nolan | H04L 67/125 |
| 2019/0230413 A1* | 7/2019 | Honjo | H04W 76/19 |

\* cited by examiner

METHOD FOR IDENTIFYING IP CAMERA AND ENHANCING TRANSMISSION QUALITY BY PACKET TRANSMISSION BASED ON ONVIF SPECIFICATIONS

FIELD OF THE INVENTION

The present invention relates to a method for identifying an IP (Internet Protocol) camera and enhancing transmission quality by transmitting packets in accordance with the ONVIF (Open Network Video Interface Forum) specifications. More particularly, the invention relates to a method by which a gateway device (e.g., a network switch) performs data transmission to and from an IP camera according to the ONVIF specifications in order to identify the IP camera accurately and add an exclusive group code (e.g., VLAN ID) and the highest transmission speed classification (e.g., Quality of Service) to audiovisual data transmitted from the IP camera so that the audiovisual data can be transmitted with higher priority. The gateway device may also incorporate a network security protocol to ensure transmission stability.

BACKGROUND OF THE INVENTION

Referring to FIG. 1, a network surveillance system 1 typically includes a network switch (whose role is equivalent to that of the gateway device 12 in FIG. 1) connected with a plurality of IP cameras 11 and a network surveillance device (e.g., a network video recorder, or NVR) 13. Images taken by the IP cameras 11 are forwarded by the network switch to the network video recorder 13 for storage. While network switches bring security and convenience to networking, their difficult setting procedures hinder the traditional closed-circuit television (CCTV) service providers from entering the digital surveillance market and taking advantage of the convenience provided by digitization.

When setting a network switch, a large number of factors must be considered in order to achieve the optimal configuration. In fact, the factors are so many that even an IT professional is not immune to setting errors. Should a wrong setting be made, operation and maintenance of the afflicted network switch will present a problem. For example, it is not uncommon that a variety of terminal devices 14 (e.g., personal computers, IPTV receivers, and cloud storage devices) coexist in the local network where the IP cameras 11 are installed. In that case, data packets of different types tend to share the same network and end up mixed together, occupying a considerable portion of the bandwidth of the local network. Furthermore, these packets are not classified by transmission speed, so delayed transmission, or even loss, of important image packets takes place frequently. As a result, stored image frames get missing, and low replay quality ensues. This partly explains why, despite the prevalence of surveillance systems nowadays, businesses are still subject to irreparable losses attributable to the absence of critical surveillance images.

The issue to be addressed by the present invention is to improve the conventional network surveillance system 1 so that the onerous setting process can be dispensed with, allowing a user with basic network knowledge to complete all the complicated settings rapidly with the assistance of system automation, without having to perform an optimization operation or other command-based operations manually.

BRIEF SUMMARY OF THE INVENTION

One objective of the present invention is to provide a method for identifying an IP camera and enhancing transmission quality by packet transmission based on the ONVIF specifications. The method is applicable to a network surveillance system that includes at least one IP camera, a gateway device, and a network video recorder, wherein the gateway device is configured for data transmission to and from the IP camera and the network video recorder in a wired or wireless manner according to the ONVIF specifications. To carry out the method, the gateway device performs the following steps: receiving a first Hello packet from the IP camera; sending a first Probe packet to the IP camera according to the Web Services Dynamic Discovery (WS-Discovery) protocol; receiving a first ProbeMatch packet from the IP camera and obtaining the equipment parameters in the first ProbeMatch packet through an analysis based on the ONVIF specifications, thereby identifying the IP camera; relaying a Resolve packet from the network video recorder to the IP camera; and receiving audiovisual data from the IP camera and adding a group code to the audiovisual data so that the audiovisual data with the group code are given higher priority in terms of transmission to the network video recorder. By analyzing the first ProbeMatch packet according to the ONVIF specifications to obtain the equipment parameters in the first ProbeMatch packet, the gateway device can identify the IP camera clearly. Then, with the group code, the gateway device marks the audiovisual data sent from the IP camera to distinguish the audiovisual data from other network packets, thereby giving higher priority of transmission to the audiovisual data, ensuring that the network video recorder will receive the audiovisual data not only in real time but also completely and stably.

BRIEF DESCRIPTION OF THE SEVERAL VIEWS OF THE DRAWINGS

The technical features, operation method, and objectives of the present invention can be better understood by referring to the following detailed description of an illustrative embodiment in conjunction with the accompanying drawings, in which.

DETAILED DESCRIPTION OF THE INVENTION

To overcome the difficulties of setting a network surveillance system, the inventor of the present invention came up with the idea of automatically identifying an IP camera by means of the ONVIF specifications. That is to say, once an IP camera conforming to the ONVIF specifications is connected to a gateway device, the gateway device can automatically obtain the various information provided by the IP camera and then automatically complete the setting of all the necessary parameters. It should be pointed out that the gateway device may be a network switch, an access point, a router, a network video recorder, a network-attached storage (NAS), a modem, a firewall device, or the like, provided that the gateway device can perform the procedures disclosed in the following embodiment.

Figure 1:
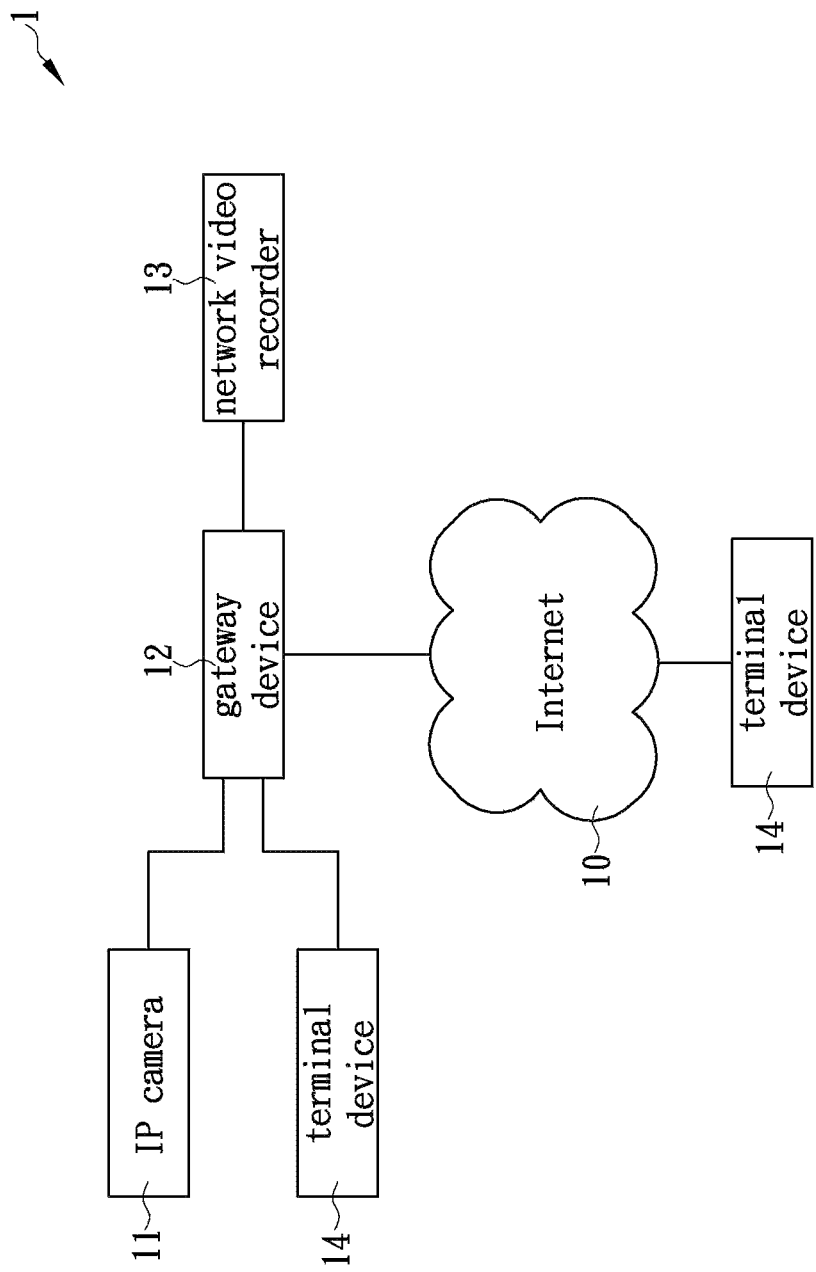
FIG. 1 schematically shows a network surveillance system.

The present invention provides a method for identifying an IP camera and enhancing transmission quality by packet transmission based on the ONVIF specifications. FIG. 1 shows a network surveillance system 1 to which the method is applied, wherein the network surveillance system 1 includes at least one IP camera 11, a gateway device 12 (e.g., a network switch), and a network video recorder 13. The gateway device 12 can carry out data transmission to and from the IP camera 11 and the network video recorder 13 in a wired or wireless manner according to the ONVIF specifications. The ONVIF specifications require a data packet to include complete equipment (e.g., camera) information such as brand, hardware information, model number, type of equipment, IP address, and metadata. Such data packets are available for data exchange in Extensible Markup Language (XML).

Figure 2:
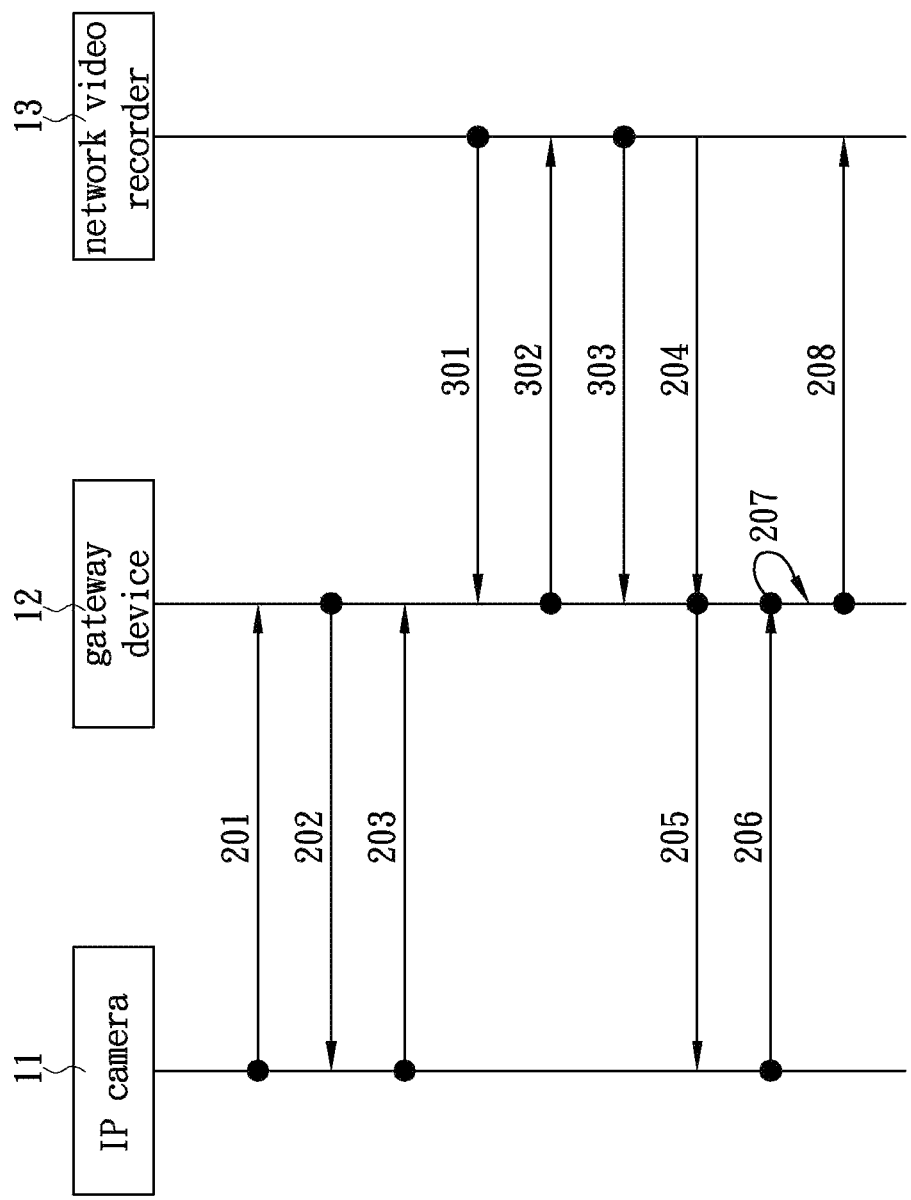
FIG. 2 is a flowchart showing the process flow of the method of the present invention.

According to the present invention, referring to FIG. 1 and FIG. 2, the major steps to be performed by the gateway device 12 are as follows:

(201) To start with, the gateway device 12 receives a first Hello packet from the IP camera 11. For example, the IP camera 11 sends out a "Hello" packet by broadcasting.

(202) Then, the gateway device 12 sends a first Probe packet to the IP camera 11 according to the WS-Discovery protocol. For example, the gateway device 12 sends out a "Probe" packet by multicasting.

(203) After receiving the first Probe packet, the IP camera 11 sends a first ProbeMatch packet to the gateway device 12. The gateway device 12 analyzes the received first ProbeMatch packet according to the ONVIF specifications in order to obtain the equipment parameters in the first ProbeMatch packet and thereby identify the IP camera 11. For example, the IP camera 11 sends a "ProbeMatch" packet to the gateway device 12 by unicasting, and this first ProbeMatch packet records all the equipment parameters (e.g., model number, manufacturer, type of equipment, and the camera to which the parameters belong) in XML.

(204) When the administrator of the network surveillance system 1 begins a surveillance operation, the gateway device 12 receives a Resolve packet from the network video recorder 13.

(205) The gateway device 12 relays the Resolve packet to the IP camera 11, and the IP camera 11 sends an acknowledgement packet (e.g., a "ResolveMatch" packet) to the gateway device 12 in turn, thereby establishing connection between the IP camera 11 and the network video recorder 13.

(206) The gateway device 12 receives audiovisual data from the IP camera 11.

(207) The gateway device 12 adds a group code to the audiovisual data.

(208) The gateway device 12 sends the audiovisual data with the group code to the network video recorder 13, wherein the exclusive group code gives higher priority of transmission to the audiovisual data.

According to the above, the gateway device 12 can clearly identify the IP camera 11 based on the equipment parameters obtained from the first ProbeMatch packet by analyzing the same packet in accordance with the ONVIF specifications. Then, by adding the group code to the audiovisual data sent from the IP camera 11, the gateway device 12 distinguishes the audiovisual data from other network packets and gives higher priority of transmission to the audiovisual data, ensuring that the network video recorder 13 will receive the entire audiovisual data in real time stably.

In addition to receiving audiovisual data from the IP camera 11, the gateway device 12 is configured for connecting with at least one terminal device 14 through the Internet and transmitting common network data (i.e., non-audiovisual data) to and from the terminal device 14. Upon receiving such network data from the terminal device 14, the gateway device 12 adds another group code to the network data. This group code is different from and has lower priority than the group code added to audiovisual data so that audiovisual data will not mix up with common network data and have low transmission quality as a result.

The steps stated above are only the core ones the gateway device 12 has to perform according to the present invention. In practice, the IP camera 11, the gateway device 12, and the network video recorder 13 can identify one another by different sets of steps. Referring again to FIG. 1 and FIG. 2, the gateway device 12 can identify the network video recorder 13 by performing the following steps before adding a group code to the audiovisual data received:

(301) The gateway device 12 receives a second Hello packet from the network video recorder 13. For example, the network video recorder 13 sends out a "Hello" packet by broadcasting.

(302) The gateway device 12 sends a second Probe packet to the network video recorder 13 according to the WS-Discovery protocol.

(303) The gateway device 12 receives a second ProbeMatch packet from the network video recorder 13 and analyzes the second ProbeMatch packet according to the ONVIF specifications in order to obtain the equipment parameters (e.g., brand, hardware information, and model number) in the second ProbeMatch packet and thereby identify the network video recorder 13.

Commercially available network video recorders 13 do not necessarily record their equipment parameters in the second ProbeMatch packet completely (which practice varies from one brand to another). To deal with cases where the second ProbeMatch packet does not include equipment parameters, the gateway device 12 can be configured to carry out network video recorder identification in a different way. In this embodiment, the gateway device 12 is provided therein with a plurality of transmission ports, and before adding a group code to the audiovisual data received, the gateway device 12 performs the following steps to identify the network video recorder 13. First, the gateway device 12 receives the second Hello packet (e.g., a "Hello" packet) from the network video recorder 13 and sends the second Probe packet to the network video recorder 13 according to the WS-Discovery protocol. Then, the gateway device 12 receives the second ProbeMatch packet from the network video recorder 13. If the gateway device 12 determines that the second ProbeMatch packet does not include equipment parameters, the gateway device 12 will snoop the packets of each transmission port and record the transmission port receiving the first ProbeMatch packet (from the IP camera 11) as a "source port" and the transmission port receiving the second ProbeMatch packet (from the video recorder 13) as a "destination port". When the gateway device 12 subsequently determines that audiovisual data are being transmitted between the source port and the destination port, the gateway device 12 will identify the destination port as connected to the "network video recorder 13" and then add a group code to the audiovisual data.

In this embodiment, the gateway device 12 is further provided therein with a surveillance module. The surveillance module is configured mainly for detecting the working states of the IP camera 11 and of the network video recorder 13, with a view to ensuring continuous, normal transmission of audiovisual data. As stated above, the gateway device 12 can tell the IP camera 11 and the network video recorder 13 apart, so by means of the surveillance module, the gateway device 12 can perform additional steps to enhance its transmission security. These steps include:

(1) starting the Internet Group Management Protocol (IGMP) so that multicast data packets will not go astray in the network and reduces the multicast traffic;

(2) starting the Loop Detection Protocol to prevent erroneous connection between different pieces of equipment; and (3) activating a network cable diagnostic function to inform users of network cable faults (e.g., a short in a cable) and the distance to an open in a network cable.

The technical feature of the present invention consists in enhancing the transmission quality of video packets after automatic IP camera identification. The goal is to ensure against any loss of surveillance image packets when network packets of different types are being forwarded in large quantities, thus enabling real Plug and Play of network management equipment and safeguarding important surveillance image data as well.

While the invention herein disclosed has been described by means of specific embodiments, numerous modifications and variations could be made thereto by those skilled in the art without departing from the scope of the invention set forth in the claims.

What is claimed is:

1. A method for identifying an IP (Internet Protocol) camera and enhancing transmission quality by packet transmission based on ONVIF (Open Network Video Interface Forum) specifications, wherein the method is applicable to a network surveillance system comprising at least one said IP camera, a gateway device, and a network video recorder, and the gateway device is configured for data transmission to and from the IP camera and the network video recorder in a wired or wireless manner according to the ONVIF specifications, the method comprising the steps, to be performed by the gateway device, of:

receiving a first Hello packet from the IP camera;

sending a first Probe packet to the IP camera according to the Web Services Dynamic Discovery (WS-Discovery) protocol;

receiving a first ProbeMatch packet from the IP camera, and analyzing the first ProbeMatch packet according to the ONVIF specifications to obtain equipment parameters in the first ProbeMatch packet and thereby identify the IP camera according to the equipment parameters;

relaying a Resolve packet from the network video recorder to the IP camera;

receiving audiovisual data from the identified IP camera;

adding a group code indicative of higher transmission priority only to the audiovisual data received from the identified IP camera; and transmitting with higher priority only the audiovisual data with the group code received from the identified IP camera to the network video recorder;

connecting with at least one terminal device in order to carry out data transmission to and from the terminal device; and upon receiving non-audiovisual network data from the terminal device, adding a second group code to the non-audiovisual network data, wherein the second group code is different from and has lower priority than the group code added to the audiovisual data.

2. The method of claim 1, further comprising the steps, to be performed by the gateway device before adding the group code to the audiovisual data in order for the gateway device to identify the network video recorder, of:

receiving a second Hello packet from the network video recorder;

sending a second Probe packet to the network video recorder according to the WS-Discovery protocol; and receiving a second ProbeMatch packet from the network video recorder, and analyzing the second ProbeMatch packet according to the ONVIF specifications to obtain equipment parameters in the second ProbeMatch packet and thereby identify the network video recorder.

3. The method of claim 1, wherein the gateway device is provided therein with a plurality of transmission ports, the method further comprising the steps, to be performed by the gateway device before adding the group code to the audiovisual data in order for the gateway device to identify the network video recorder, of:

receiving a second Hello packet from the network video recorder;

sending a second Probe packet to the network video recorder according to the WS-Discovery protocol;

receiving a second ProbeMatch packet from the network video recorder;

recording a said transmission port receiving the first ProbeMatch packet as a source port and a said transmission port receiving the second ProbeMatch packet as a destination port, upon determining that the second ProbeMatch packet does not include equipment parameters; and upon determining that the audiovisual data are transmitted between the source port and the destination port, identifying the destination port as connected to the network video recorder and adding the group code to the audiovisual data.

4. The method of claim 1, wherein the equipment parameters in the first ProbeMatch packet are recorded in Extensible Markup Language (XML).

5. The method of claim 2, wherein the equipment parameters in the first ProbeMatch packet are recorded in Extensible Markup Language (XML).

6. The method of claim 3, wherein the equipment parameters in the first ProbeMatch packet are recorded in Extensible Markup Language (XML).

7. The method of claim 5, wherein the gateway device is also configured for connecting with at least one terminal device in order to carry out data transmission to and from the terminal device, the method further comprising the step, to be performed by the gateway device upon receiving non-audiovisual network data from the terminal device, of adding a second group code to the non-audiovisual network data, wherein the second group code is different from and has lower priority than the group code added to the audiovisual data.

8. The method of claim 6, wherein the gateway device is also configured for connecting with at least one terminal device in order to carry out data transmission to and from the terminal device, the method further comprising the step, to be performed by the gateway device upon receiving non-audiovisual network data from the terminal device, of adding a second group code to the non-audiovisual network data, Wherein the second group code is different from and has lower priority than the group code added to the audiovisual data.

* * * * *